United States Patent Office 3,019,024

Patented Jan. 30, 1962

3,019,024
PHONOGRAPH TEST METHOD

Jack Feinstein, Hicksville, N.Y., assignor to the United States of America as represented by the Secretary of the Navy No Drawing. Filed May 17, 1957, Ser. No. 660,014
2 Claims. (Cl. 274—46)
(Granted under Title 35, U.S. Code (1952), sec. 266)

The invention described herein may be manufactured and used by or for the Government of the United States of America for governmental purposes without the payment of any royalties thereon or therefor.

This invention relates to an improved method of determining performance of phonograph playback systems, or phonograph cartridges, or phonograph styli and more particularly this invention relates to an improved method of determining their performance through the use of signals recorded continuously along the length of respective locked circular grooves concentric with the axis of rotation of a test disk.

In the past, spiral groove test disks have been used as signal sources in determining performance of phonograph playback systems, cartridges, or styli. Usually, the spiral groove on the test disk was continuous and was cut from the outside towards the center of the disk. Signals of desired frequencies and amplitudes were recorded along the spiral either by lateral or vertical modulation. The spiral groove length allotted for any one signal was short in order to provide the maximum number of recorded signals along the spiral in the limited space available on a disk and also to minimize variations in each one of the recorded signals.

One disadvantage of the use of spiral test disks is that during a test, any one signal is available at the stylus for a very short time and measurement procedures made necessary by the short time character of the test are difficult, cumbersome and not sufficiently reliable.

Another disadvantage of the use of spiral disks is that it is impossible to obtain precise measurements. Spiral grooves introduce both long and short time variations in signal amplitude and distortion. The variations become more pronounced with decrease in wavelength. There is a variation in playback loss with change in radius of the groove and a consequent lack of stability in measurements taken as the spiral groove moves past the stylus. There is a gradual decrease in reproduced signal amplitude from the end of the spiral groove closer to the outside of the disk to the end of the groove closer to the center of the disk.

Another disadvantage of the use of spiral disks is that during recording, the signal in the groove is distorted due to the interaction between adjacent grooves as a result of the radial flow of disk material between adjacent grooves as each successive 360 degrees of the spiral moves past the recording stylus.

Another disadvantage of the use of spiral disks is that variations are introduced into a signal recorded thereon due to dissimilarity in disk material along a relatively long spiral path.

Another disadvantage of the use of spiral disks is that during recording of a signal along a spiral groove, there is a gradual decrease in the groove velocity, i.e., the linear speed of the spiral groove relative to the recording stylus decreases in direct proportion to decrease in radius of the spiral so that there is a decrease in the recorded wavelength of the signal.

Other disadvantages of the use of spiral disks are that on reproduction, there are variations in the reproduced signal due to changes in playback loss, tracing distortion, pinch effect, tracking angle, flutter, and induced hum and vibration pickup.

An object of this invention is to provide an improved method of determining performance of phonograph disk playback systems, phonograph cartridges, or phonograph styli.

A further object is to provide an improved method of determining performance of phonograph disk playback systems, phonograph cartridges, or phonograph styli by providing for driving a stylus selected mechanical signals each of which is substantially pure in frequency and constant in amplitude and devoid of variations.

A further object is to provide an improved method of determining performance of phonograph disk playback systems, phonograph cartridges, or phonograph styli by providing for driving a stylus, a continuous mechanical signal that is constant in amplitude and that is a swept frequency of particular limits and that repeats periodically and that is devoid of other variations.

A further object is to provide an improved method of determining performance of phonograph disk playback systems, phonograph cartridges, or phonograph styli by providing for driving a stylus, a continuous mechanical signal that is constant in amplitude and that is a combination of two particular pure frequencies and that is devoid of variations for the particular purpose of ascertaining the degree of intermodulation distortion in the phonographic device.

A further object is to provide an improved method in accordance with the foregoing object and which provides a periodic marking signal.

It has been determined that substantially all of the aforementioned disadvantages of the use of spiral groove disks for testing are obviated or minimized by this invention which includes the use of disks with locked circular concentric grooves. A locked concentric groove is cut on a disk during a 360 degree revolution of the disk at a constant angular velocity and at a constant radial distance from the axis of rotation of the disk.

A first step in practising this invention is to decide on the amplitude and the frequency character of the signal to be recorded for test purposes. The considerations that govern this first step are known to those skilled in the art since the use of a spiral groove involves the same consideration. Insofar as the frequency is concerned the signal may be a pure frequency, a swept frequency between two particular limits, or a combination of two pure frequencies depending upon the type of measurements desired. Then the next step is to adjust the conventional recording apparatus for the desired signal. A conventional record disk is placed on the recorder. The recorder turntable is set. The radial feed for the cutting head is disengaged. Then, by hand, the cutting stylus is moved into engagement with the record. Care is exercised not to bring the cutting stylus into engagement with the record with enough force to gouge the record. Raising the temperature of the stylus and disk reduces the possibility of gouging; another affect of raising the temperature is that the instantaneous loading is reduced, minimizing flutter as a consequence of the sudden loading. The cutting of the groove is observed and just as the groove is completed, the cutting stylus is disengaged from the disk by hand. It has been determined by experiment that excellent results are obtainable by this manual method.

For most test purposes, it is desirable that the resultant groove have no discontinuity between the beginning and end thereof. In other words, the groove should be 360 degrees plus or minus zero. Also the radius of the groove is selected to provide waveform continuity. For a particular frequency and a particular angular velocity of the turntable there are a particular number of waveform cycles per unit length of groove. By proper choice of radius, a continuous waveform can be obtained in the groove.

Electromechanical control means may be used instead of hand control to move the cutting stylus into and out of engagement with record disk. The use of electromechanical control means would provide results closer to perfection described in the preceding paragraph than is obtainable by the manual method. However, excellent results are obtainable with the manual method by cutting at a reduced turntable speed and reducing the frequencies to be recorded by the same factor. In other words the desired signal is recorded at a lower linear groove velocity than at playback thus rendering it much easier to provide a disk with a precisely locked groove. The lower limit of recording speed depends upon the flutter characteristics of the recorder turntable. By experiment it was found that most locked circular grooves obtained under manual control were locked so precisely that for practical purposes the grooves were continuous. In the course of subsequent measurements, there was no evidence of a discontinuity for most of the grooves formed by the manual method. For some of the grooves the measurement instruments did indicate some discontinuity but not enough to interfere with the measurements. In some circumstances, a discontinuity is desired to provide a periodic marking pulse. Overcutting can provide the desired discontinuity.

A number of locked concentric grooves may be cut on one record disk, each groove having a different signal. The grooves are spaced much further apart than spiral grooves in order to prevent interaction between grooves due to radial flow of record material during cutting.

In many instances it is desirable to include on the record an identification of the signal in the locked groove. The information can readily be recorded in a short length of spiral groove leading into the locked groove. The information may be provided by one word or several words. To obtain the spiral lead-in groove by the manual method, an exaggerated radial feed is provided the cutting stylus when the stylus is engaged with the record disk and after the identification information is completed on the spiral lead-in groove the radial feed for the cutting stylus is disengaged. The stylus then cuts the circular groove recording the desired signal. The spiral lead-in serves another important function; it also overcomes the problem of gouging and loading flutter at the beginning of the circular groove.

The completed test record may include one or a substantial number of circular locked grooves each having a particular signal recorded therein. The test record then is placed on the turntable of the phonograph apparatus to be tested. If just a stylus or a cartridge is tested the characteristics of the remainder of the phonograph apparatus is ascertained from previous tests. The output of the phonograph apparatus is connected to any one or group of conventional measuring apparatus including instruments such as a voltmeter, an oscilloscope, a flutter meter, a wow meter, a frequency analyzer, and distortion measuring means.

A disk formed with locked circular grooves has many desirable characteristics that are important in the testing of phonograph apparatus. First, the usefulness of the test disk is multiplied because a large number of separate signals may be recorded thereon. Second, groove velocity under the stylus is constant whereby recorded wavelength of any one frequency is constant. Third, a stylus can be continuously driven by a modulated circularly locked groove for as long as desired, the only limitation being the wearing ability of the disk material and the stylus material; experiments have shown that wear is not significant for several hours. Fourth, in any single circular locked groove, dissimilarity of disk material is minmal whereby variation in mechanical impedance as seen by the cutter head stylus is minimal. Fifth, each recorded signal need only occupy the distance of one groove. Sixth, the interference of dust in a locked circular groove is far below that in a comparatively lengthy spiral groove. Seventh, because a considerable distance can be alloted between grooves, the effects, radial flow of disk material during cutting, namely pre-echo, post echo are avoided; the considerable distance between grooves permits distortionless reproduction of signals of far greater amplitude than was possible with spirally grooved test records. Eighth, a marking signal can be injected easily, if desired, by intentional overcutting of the groove by a small amount. Ninth, a concentric locked groove does not suffer a serious fault of a spiral groove; in a spiral groove, the radius of curvature of the groove modulation decreases for any fixed-amplitude fixed-frequency signal as the distance from the center of the disk to the groove decreases because the linear groove velocity and thus the recorded wavelength decreases; as the radius of curvature of the modulation approaches that of the playback stylus, the playback distortion increases.

To further specify the new and unobvious improved results obtained when phonograph devices are tested through the use of disks with circular locked grooves instead of disks with spiral grooves several of the usual tests for phonograph apparatus are described below.

One of the better methods of obtaining cartridge and stylus frequency response is by resort to the variable speed turntable method. In other words signal frequency at the playback stylus is adjusted by adjusting the linear groove velocity under the stylus. There is a source of error when a spiral groove test disk is used due to the fact that each recorded signal occupies a number of grooves. The signal distortion and loss changes as the groove radius changes for reasons discussed above. The radius of a circular locked groove is constant and does not introduce any such changes. Additionally, long time excitation provided by the use of the circular locked groove test disk permits the variable speed turntable speeds to be very accurately set with the aid of Lissajous patterns on an oscilloscope.

Disks with sweep frequency signals of various ranges of sweep, for example, 50 cycles per second to 10 kilocycles per second at a repetitive rate of approximately 20 cycles per second are used in conjunction with an oscilloscope to obtain a qualitative analysis of cartridge frequency response and for adjusting equalizer networks. Here too, a major difficulty with the spiral groove test disk is the loss and distortion changes accompanying change in groove radius. Also with a spiral groove there is difficulty in maintaining synchronism on the oscilloscope. A long time of excitation is necessary in this type of test; with a spiral groove the entire test disk necessarily consists of one repetitive sweep signal. If a circular locked groove test disk is used, long time excitation is obtainable without the difficulties mentioned above.

In order to measure the mechanical impedance and the electrical impedance of a phonograph cartridge, a stable long time excitation must be applied thereto. This is not possible or at the very best extremely difficult to provide with a spiral groove test disk but is satisfactory and very readily provided with a circular locked groove test disk.

In order to measure cartridge harmonic distortion long time stable excitation must be provided to the stylus. For this test, it is desirable to use a push button type total harmonic distortion analyzer which is well known in the art. A spiral groove test disk does not provide the stable excitation nor the long time excitation that will enable a harmonic distortion analysis. The circular locked groove test disk not only provides a more stable excitation, but also provides the long time excitation that is needed.

In order to measure the intermodulation distortion of a cartridge, a spiral groove test disk may be used but is not satisfactory due to the fact that a relatively long time excitation without change in playback loss is needed; change in playback loss results in the shifting of the 100% carrier level with consequent difficulty in obtaining accurate measurements. The use of the circular locked groove test disk has provided long time stable excitation whereby the above-mentioned difficulty does not arise.

A method of obtaining the flutter characteristics of a phonograph turntable drive system can be carried out with the aid of an instrument called a photographic wow meter. The time of excitation needed to obtain this photographic record is approximately 40 seconds for adjustment of controls and for recording. A spiral groove test disk can supply the excitation by replaying a 15 second 1,000 c.p.s. signal 2 or 3 times. A change in reproduced amplitude does not affect the results since they are independent of amplitude. However, by use of the circular locked groove test disk on which there is intentionally provided a slight amount of overcutting for a timing signal, each cycle of flutter corresponding to each revolution of the turntable will be identical; this is not the case with spiral grooved test disks. Rotation of the locked groove test disk with respect to the turntable a selected amount will permit in conjunction with the timing signals obtained by overcutting, an analysis of the flutter content of the test record and that produced by the turntable drive system.

The determination of the lateral compliance of a playback stylus as found by the resonant frequency method can be considerably speeded up by the use of the long time signal obtainable from the circular locked groove test disk as compared to the time involved when using a spiral groove test disk. Here again, turntable speed and reproduced frequency may be found more readily due to the ease of obtaining Lissajous patterns on an oscilloscope.

Photographs of frequency repsonse from sweep frequency records or from reproduction at discrete frequencies as reproduced on oscilloscopes can be more readily obtained from circular locked groove test disks due to improved stability of reproduced amplitude and synchronization as compared to that obtained from spiral groove test disks.

Distortion of a played back signal may be caused by vibration of the playback stylus when it is at an angle other than 90 degrees to the cartridge axis. By recording a fixed frequency at different distances from the center of rotation of the test disk the effect of this distortion can be determined. Each circular locked groove is able to provide the long time excitation which is required for this particular test as well as the ability to vibrate the stylus at a fixed angle with respect to the cartridge axis; this cannot be accomplished by the use of spiral groove test disks.

By the use of a low frequency recorded signal in the neighborhood of 30 cycles per second, and a variable speed turntable it is possible to determine the mechanical low frequency resonance, and the mechanical constants of the pickup system. The use of a concentric groove for the necessary low frequency signal would be preferable since this measurement can take anywhere from 10 to 20 minutes.

Testing the wearing ability of different styli with a spiral groove test disk requires an automatic changer.

A circular locked groove test disk does not require a record changer. A major difficulty with wear tests, stems from dust collection on the record. The dust comes in contact with the stylus and adheres to it. The groove distance covered by the stylus in the course of one wear test may be a mile or more. This is a substantial problem if a spiral groove test disk is used because this allows time for dust to settle on the disk and be picked up by the stylus. With a circular locked groove test disk the dust problem is substantially eliminated since the dust that collects in only one groove is very small.

Obviously many modifications and variations of the present invention are possible in the light of the above teachings. It is therefore to be understood that within the scope of the appended claims the invention may be practiced otherwise than as specifically described.

I claim:

1. A method of cutting with a stylus a disk record for testing phonographic equipment to form a circular locked groove in said record of selected radius concentric with its axis of rotation to provide mechanical wavelength modulation along said groove that is substantially greater than the stylus point size of phonographic equipment to be tested through the use of said record, comprising driving said stylus with a selected tone signal, supporting and rotating said disk at a constant rate selected for recording at the desired linear wavelength, bringing said stylus into engagement with said record at a radius different from the radius selected for the groove, displacing said stylus to said selected radius at a selected rate for minimizing instantaneous loading flutter in said groove and retaining said stylus in engagement with said record at the selected radius for an interval long enough for said record to describe 360 degrees of rotation under said cutting stylus and then separating said stylus from said record.

2. A method of cutting a disk record as defined in claim 1 further including the step of heating said cutting stylus and said record before engagement of said stylus with said record to reduce gouging and flutter when they are engaged.

References Cited in the file of this patent

UNITED STATES PATENTS

| | | |
|---|---|---|
| 786,347 | Darby | Apr. 4, 1905 |
| 1,734,675 | Hull | Nov. 5, 1929 |
| 2,200,918 | Dunning | May 14, 1940 |
| 2,248,081 | Herman | July 8, 1941 |
| 2,519,103 | Block | Aug. 15, 1950 |
| 2,549,066 | Dixon | Apr. 17, 1951 |
| 2,585,291 | Willel | Feb. 12, 1952 |
| 2,588,680 | Williams | Mar. 11, 1952 |
| 2,759,049 | Scott | Aug. 14, 1956 |
| 2,866,012 | Ginsburg | Dec. 23, 1958 |

FOREIGN PATENTS

| | | |
|---|---|---|
| 725,090 | Great Britain | Mar. 2, 1955 |